(12) United States Patent
Dalsgaard (10) Patent No.: US 7,133,383 B2
(45) Date of Patent: Nov. 7, 2006

(54) METHOD AND ARRANGEMENT FOR CONTROLLING CELL CHANGE AND A TERMINAL OF A CELLULAR SYSTEM

(75) Inventor: Lars Dalsgaard, Oulu (FI)

(73) Assignee: Nokia Mobile Phones Ltd., Espoo (FI)

( * ) Notice: Subject to any disclaimer, the term of this patent is extended or adjusted under 35 U.S.C. 154(b) by 1102 days.

(21) Appl. No.: 09/812,932

(22) Filed: Mar. 20, 2001

(65) Prior Publication Data

US 2002/0036995 A1    Mar. 28, 2002

(30) Foreign Application Priority Data

Mar. 22, 2000    (FI) .................................. 20000675

(51) Int. Cl.
*H04Q 7/00* (2006.01)
(52) U.S. Cl. ...................... 370/331; 455/436
(58) Field of Classification Search ........ 370/331–334; 455/436–443
See application file for complete search history.

(56) References Cited

U.S. PATENT DOCUMENTS

| | | | | |
|---|---|---|---|---|
| 5,940,761 A | * | 8/1999 | Tiedemann et al. | 455/437 |
| 6,078,813 A | * | 6/2000 | Ljung | 455/436 |
| 6,094,575 A | * | 7/2000 | Anderson et al. | 455/422.1 |

OTHER PUBLICATIONS

An English Abstract of Finnish Patent Application No. 991333 (parallel to the U.S. Appl. No. 09/591,628).
"The GSM System for Mobile Communication", Mouly et al., section 7.1.2.2, pp. 452-458.
ETSI 05.08 version 6.4.0, relevant pages.
ETSI 04.08 version 6.2.0, relevant pages.

* cited by examiner

*Primary Examiner*—Huy D. Vu
*Assistant Examiner*—Daniel Ryman
(74) *Attorney, Agent, or Firm*—Perman & Green, LLP (57) ABSTRACT

The invention relates to an improved method and arrangement for controlling a cell change performed by a terminal of a cellular radio system. In particular the invention relates to a cell change in a situation where the terminal is connected to a special service provided by its current cell, e.g. to the GPRS service (General Packet Radio Service). An essential idea of the invention is that in conjunction with a cell change order a base station sends to the terminal information about whether the terminal is allowed not to carry out the cell change order if the terminal does not know the timing information of the new cell assigned to it. This information is advantageously sent in a signalling message of a certain service, such as the GPRS service. It is an advantage of the invention that a terminal connected to a certain service will not make unnecessary cell change attempts which are doomed to fail. The invention helps direct the cell change in such a manner that the load caused by possible repeated cell change attempts on the terminal and radio signalling is low.

28 Claims, 4 Drawing Sheets

METHOD AND ARRANGEMENT FOR CONTROLLING CELL CHANGE AND A TERMINAL OF A CELLULAR SYSTEM

BACKGROUND OF THE INVENTION

1. Field of the Invention

The invention relates to a method for controlling cell change in a service network, in which method a terminal performs neighbour cell measurements for cell change, the network makes a decision about the cell change on the basis of the results of said measurements, current network load and the service needs of the terminal, and the network sends to the terminal a cell change order instructing it to switch over to a new cell. The invention additionally relates to a base station of a cellular radio system, which base station comprises means for providing service and means for receiving signalling messages from a terminal as well as means for generating signalling messages and sending them to terminals. Furthermore, the invention relates to a terminal of cellular radio system, which terminal is equipped with means for connecting to a certain service and which comprises means for receiving signalling messages from base stations and means for performing cell specific measurements in order to find a suitable serving cell. In addition, the invention relates to a cellular radio system comprising base stations and associated cells as well as terminals, wherein the base stations are equipped with means for conveying signalling messages between the base station and a terminal, and the terminals are equipped so as to operate at a certain service level and to convey signalling messages between the terminal and base station.

2. Brief Description of Related Developments

Figure 1:
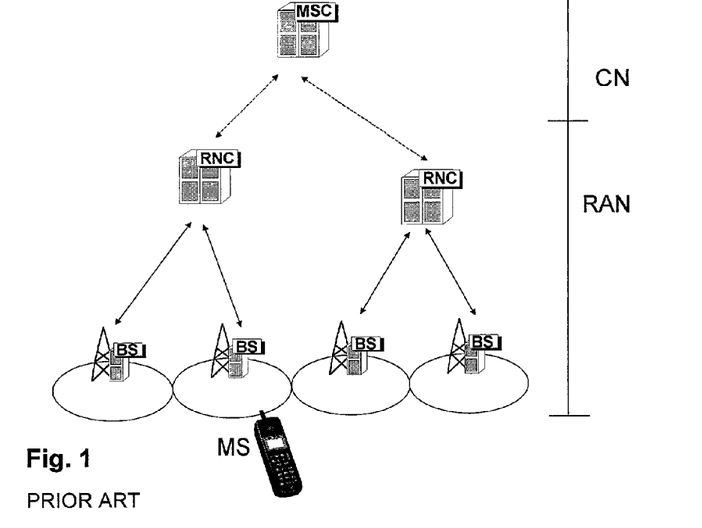
FIG. 1 shows by way of example the principal elements of a GSM network.

To provide background for the invention we will next describe some examples of prior-art solutions for changing the active cell in GSM (Global System for Mobile telecommunications) and in the General Packet Radio Service (GPRS) associated with it. FIG. 1 illustrates the basic structure of a GSM network. The mobile communication network typically comprises at least one core network (CN) and one or more radio access networks (RAN). Core networks comprise various switching systems which may offer different value-added services in addition to the versatile communications features. A core network comprises mobile services switching centres (MSC), other network elements, which in GSM include e.g. the serving GPRS support node (SGSN) and gateway GPRS support node (GGSN), and the associated transmission systems. The radio access networks are located between the core network and the terminals. A radio access network comprises base stations (BS) and a radio network controller (RNC). Each base station is connected via a fixed line to the radio network controller. The radio network controllers in turn are connected via fixed lines to at least one core network node. Between the terminals and core networks there may operate one or more radio access networks, and a terminal may be connected to a plurality of core networks via a radio access network.

A terminal of a cellular radio system always attempts to choose a base station in the coverage area, or cell, of which it camps. In the exemplary situation depicted by FIG. 2, a need for a change of cells arises at least at points P2 to P7. Conventionally, the cell change has been based on measuring the strength of the received radio signal from neighbouring cells 1 to 11 either at the terminal or base station. In GSM, for example, each base station broadcasts, at a so-called broadcast frequency, a signal which has different frequencies for the adjacent base stations. In GSM, a base station sends to a terminal, on the so-called broadcast control channel (BCCH), the parameters used by the terminal to calculate the so-called C values. Most commonly, the so-called C1 value is used in the calculation. The calculation of the C1 value is described in more detail in Michel Mouly, Marie-Bernadette Pautet, "The GSM System for Mobile Communications", section 7.1.2.2.

Terminals have to measure the reception levels of the received broadcast signals in order to be able to calculate the C1 values of the cells. The cell with the highest C1 value is the most advantageous for the radio connection. In order to optimize cell changes the network may also send additional parameters which make possible to use so-called C2 values. A more detailed description of the use of these parameters is given in reference [1]. The base stations also send to terminals information about the BCCH frequencies used in the adjacent cells so that the terminals know what frequencies they have to listen to in order to find the BCCH broadcasts of the adjacent cells.

GSM system cells provide users with basic services: audio transmission, slow data transmission, and various short message services. GSM operation has been standardized by the European Telecommunication Standardization Institute (ETSI). In GSM, the cells overlap with respect to their coverage areas, so at a cell boundary a decision has to be made about which one of the cells the terminal is to use. In addition to the quality of the connection the decision is based on other factors, too, such as the traffic load of the different cells of the network, for instance. In the active state, the decision about which cell the terminal is to use, as well as the decision about the cell change timing is made by the network, which then informs the terminal. According to an ETSI standard, a terminal in the active state cannot by itself make a decision to start using the service of another cell. A terminal in the idle state makes the decision about which cell it belongs to based on the cells' C1/C2 values which it has calculated. From the terminal's standpoint the moment of cell change is then not of great significance as all the system's cells offer the same basic services and the user of the terminal will not notice the cell change.

Figure 3:
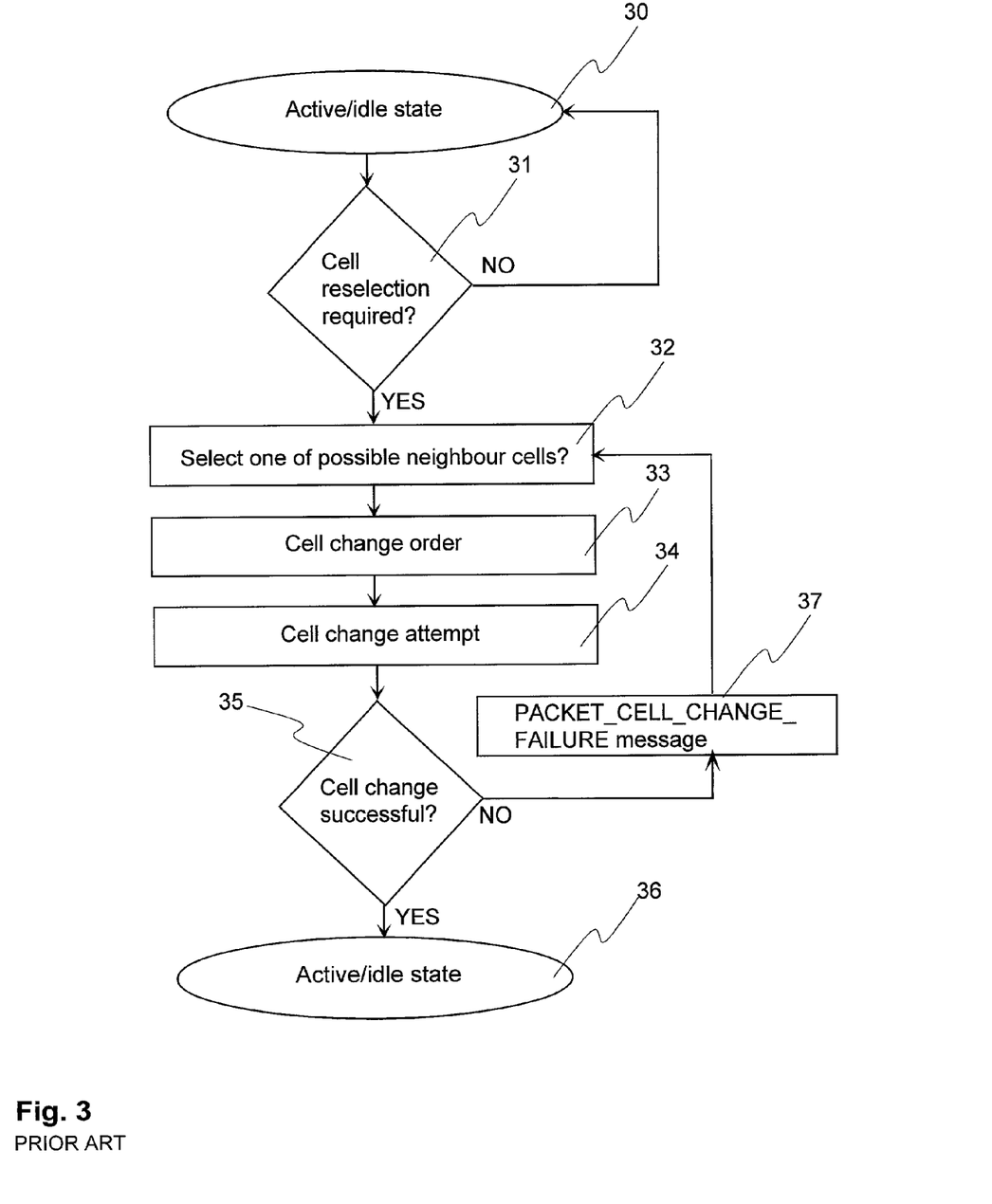
FIG. 3 shows by way of example a flow diagram of a cell change according to the prior art in the GSM system.

FIG. 3 shows as an example a flow diagram of prior-art operation in a cell change situation in connection with a basic GSM service and GPRS service. While in the idle/active state 30 the terminal performs, in the example case depicted by FIG. 3, neighbour cell measurements on the basis of which the network may estimate 31 the need for a cell change. If the result of the estimation is that a cell change is not needed, operation returns to the initial state 30. If a cell change is needed the network chooses in step 32 one of the neighbour cells as the new target cell and sends to the terminal a cell change order 33. This order may be conveyed to the terminal in the basic GSM on the common control channel (CCCH) or Slow Dedicated Control Channel (SDCCH) advantageously using a RR_CELL_CHANGE_ORDER message, in which the new serving cell is described in more detail by means of a base station identity code (BSIC) and at least the information about the absolute radio frequency number (ARFCN) of the new cell's base station. If the terminal at the initial stage 30 is connected to a GPRS service on a cell supporting PCCCH, the cell change order is conveyed on the packet common control channel (PCCCH), advantageously using a PACKET_CELL_CHANGE_ORDER message. Having received one of the above-mentioned messages the terminal must immediately attempt 34 a cell change if the operation takes place in a system according to the prior art. If the terminal does not know the timing information of the new cell, it is not possible to immediately get synchronized to the timing used by the new cell, which is indicated at step 35. In this situation the terminal returns to using the original cell and informs 37 the network that the cell change was unsuccessful using e.g. a PACKET_CELL_CHANGE_FAILURE message if the terminal is connected to a GPRS service. After that the network may give a new cell change order to the terminal, possibly targeted at the same cell. In the worst case, there may be several failed cell change attempts and returns to the original cell before a successful cell change. If, however, the terminal knows the new cell's timing information and is thus able to immediately synchronize to the cell's timing, it starts to use the new cell already at step 34. Succesfull step 35 is then followed by the active/idle state 36.

The prior-art approach described above has many drawbacks. The cell change fails if the terminal does not know the timing information of the new cell. If the cell change fails, a service used by the terminal, which is above the basic service, such as e.g. GPRS, may be disconnected because of the failed cell change. In any case the terminal may have to make several attempts to change cells, which adds to the cell change related signalling between the terminal and the base station in the serving cell.

An object of this invention is to provide a cell change procedure which minimizes unsuccessful cell change attempts to cells with which the operation of the terminal cannot be immediately synchronized at the moment of receiving the cell change order.

SUMMARY OF THE INVENTION

The objects of the invention are achieved by a procedure in which a terminal constantly monitors the timing information of the neighbour cells known to it and conveys that information to the network if the network orders the terminal to switch over to a cell the timing information of which is unknown to the terminal. As soon as the network becomes aware of the conflict, it selects on the basis of the neighbour cell information sent by the terminal another cell to which the terminal can immediately switch over without problems. The network may then consequently send to the terminal a new cell change order, instructing it to switch over to a cell with which the terminal has internal synchronization and thereby can be synchronized without problems.

It is characteristic of the cell change method according to the invention that if the new serving cell assigned to a terminal in a cell change order is a cell the timing information of which is unknown to the terminal after neighbour cell measurements, the cell change may not take place but instead the terminal may send to the base station a cell change failure message which may include various information such as the cause of the failure as well as neighbour cell information.

It is characteristic of the base station according to the invention that it comprises means for receiving and processing information coming from a terminal, which information is adapted so as to convey to the base station information about those neighbour cells known to the terminal the internal timing information of which is known to the terminal.

It is characteristic of the terminal according to the invention that it is equipped with means for determining neighbour cell timing information and means for sending neighbour cell information to the base station of its current cell when the timing information of the base station of the new cell assigned in a cell change order to the terminal by the serving base station is unknown to the terminal.

It is characteristic of the cellular radio system according to the invention that it comprises information, which is known to a terminal, about a set of neighbour cells of said terminal, the timing information of the base stations of which neighbour cells the terminal has determined, whereby said system is adapted so as to convey, after a cell change order addressed to the terminal, said information from the terminal to a base station in a signalling message for the purpose of selecting a new serving cell if the target cell assigned to the terminal in the cell change order is not included in the set of neighbour cells determined by the terminal.

Advantageous embodiments of the invention are presented in the dependent claims.

The basic idea of the invention is as follows: A cellular phone is allowed not to make a cell change attempt to a cell the timing information of which is unknown to it. This behaviour may be either set as a default in the terminal or it may be enabled in the terminal separately for each case by means of a message sent to it by the network. In practical operation, a cellular phone measures the neighbour cell information according to the prior art. This way it determines the transmission frequencies used by the base stations of neighbour cells, as well as the timing information, if possible. Thus it is possible for the terminal at any given time to know which base stations in the network can be chosen as new serving cells without problems. As a cell change order comes from the network, the switch can be performed without problems and in accordance with the prior art to a cell the timing information of which is known to the terminal and with which it is thus possible to synchronize without problems. In the case where the switch should be made to a cell with which terminal has no internal timing, the terminal, instead of attempting a cell change, uses a cell change failure message according to the invention to inform the network about the cells/base stations with which a cell change would be immediately successful. At this stage the terminal stays with the original cell until either the network assigns to it by means of a new cell change order another cell with which the terminal can synchronize immediately or until other cell change constraints/rules are fulfilled. After that, the cell change takes place as in the prior art.

An advantage of the invention is that the number of failed cell change attempts is reduced.

Another advantage of the invention is that the load caused by failed cell change attempts on network signalling is reduced.

A further advantage of the invention is that possible service breaks caused by failed cell change attempts are reduced.

A yet further advantage of the invention is that the availability of certain services (such as GPRS) is improved as unnecessary failed cell change attempts are eliminated or reduced and the terminal can be directly assigned to a cell that can immediately provide the service needed by the terminal.

DESCRIPTION OF THE DRAWINGS

The invention is described in detail in the following. Reference is made to the attached drawings in which.

DETAILED DESCRIPTION OF THE DISCLOSED EMBODIMENTS

Figure 2:
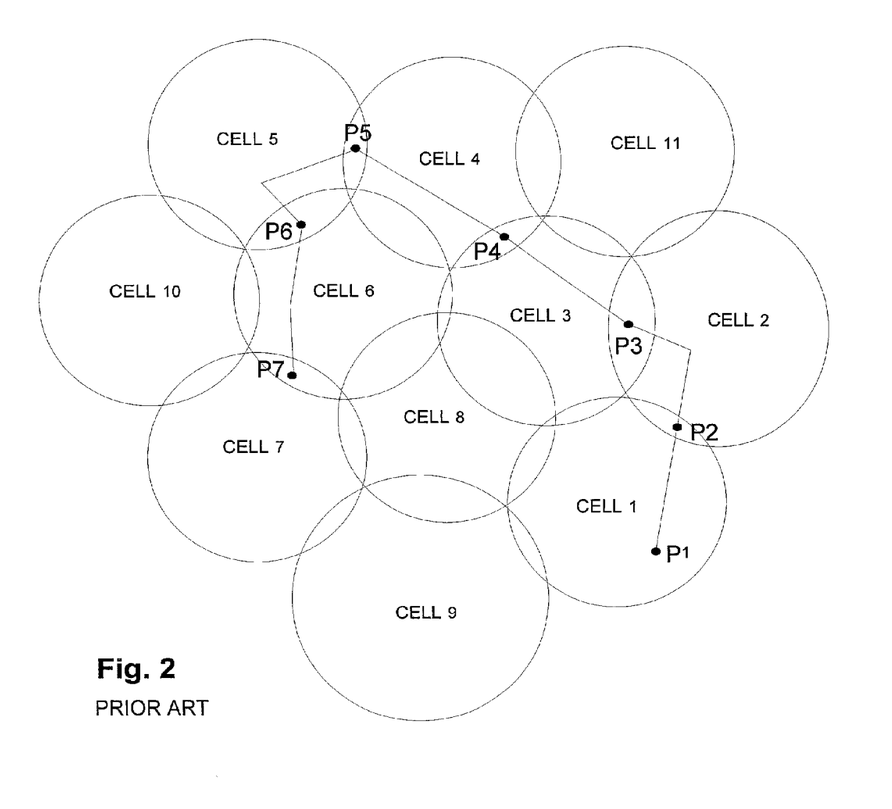
FIG. 2 shows by way of example a cell change according to the prior art in the GSM system.
Figure 4:
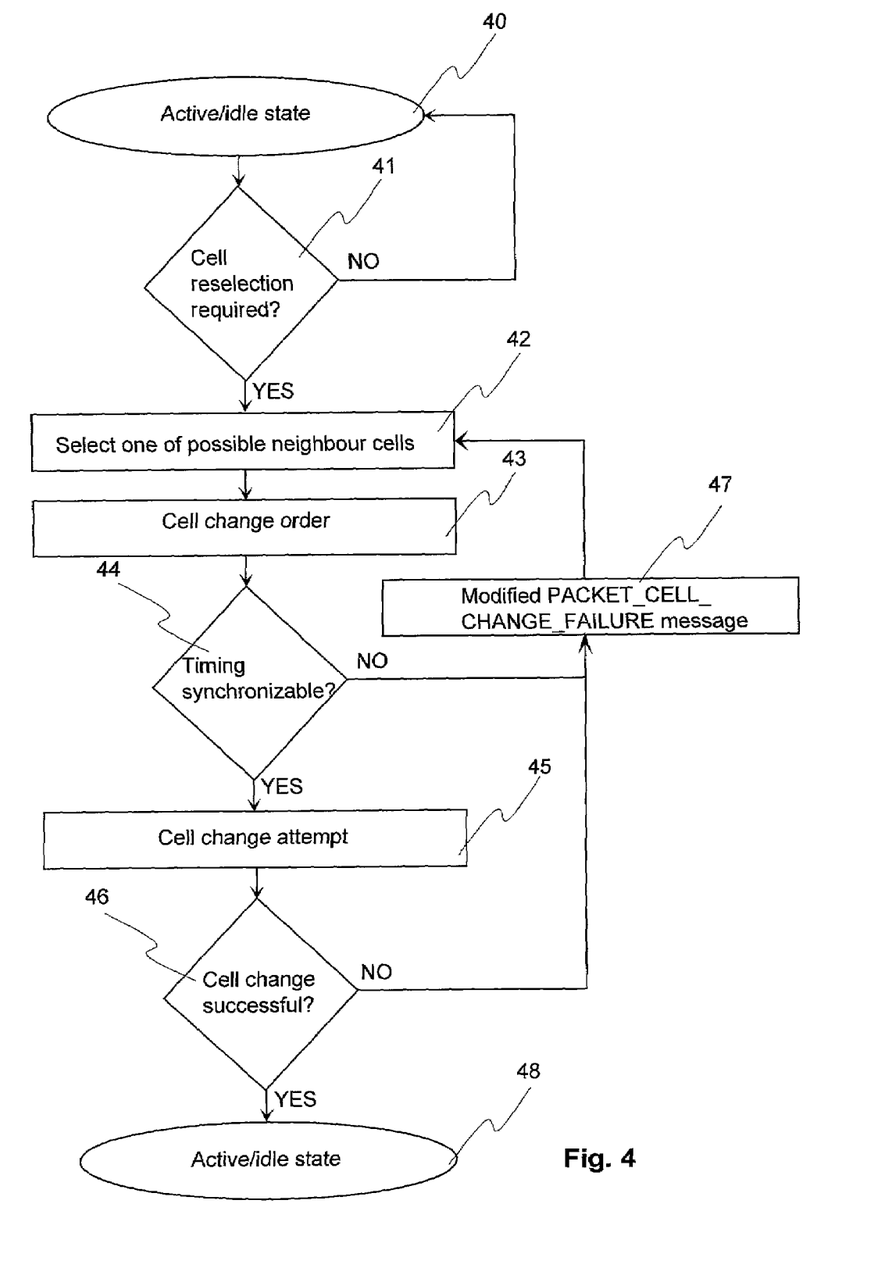
FIG. 4 shows by way of example a flow diagram of a cell change according to the invention in the GSM system.

FIGS. 1, 2 and 3 were discussed in connection with the description of the prior art. FIG. 4 shows by way of example an advantageous method of realizing the improved cell change according to the invention. Operation according to the invention may be set as a default in a terminal or the terminal may be enabled to operate according to the invention by means of a special message sent by the network. The cell change starts from the active/idle state 40 in which the cell change need is from time to time estimated 41. In the example case depicted by FIG. 4 it is the network that performs said estimation of the cell change need. If there is no need to change cells, operation returns to step 40. If a cell change is required the network selects in step 42 one of the possible neighbour cells as the new target cell. In the active state the network issues a cell change order in step 43 and in the basic GSM this order is conveyed on the CCCH or SDCCH to the terminal advantageously using a RR_CELL_CHANGE_ORDER message and in GPRS on the PCCCH or on the PACCH advantageously using a PACKET_CELL_CHANGE_ORDER message. When the terminal has received the order, it will not attempt a cell change immediately but finds out in step 44 whether the timing information of the new cell is known. If immediate synchronization with the timing of the new cell is impossible the terminal transmits advantageously a modified PACKET_CELL_CHANGE_FAILURE message 47 or another message used in connection with cell change failures. The message in question advantageously includes additional information about those neighbour cells to which the terminal can switch over immediately without synchronization problems. Having received the message the network makes a new cell change decision among the cells that were included in the message 47 from the terminal. The network sends a new cell change order 43, and in step 44 it is found that a cell change can be performed, and in step 45 the terminal immediately makes a cell change attempt. The success of the cell change attempt is tested in the step 45. If the cell change is not successful the terminal transmits advantageously a modified PACKET_CELL_CHANGE_FAILURE message in the step 47. If the cell change is successful the operation ends up in the active/idle state 48, and the procedure starts over from the beginning 40.

When a terminal according to the invention sends a message about the fact that it does not know the timing information of the cell assigned to it, the terminal may convey said information advantageously using a CELL_CHANGE_FAILURE, PACKET_CELL_CHANGE_FAILURE or HANDOVER_FAILURE message. Into the message the terminal adds information about the neighbour cells the timing information of which the terminal knows and with which a cell change would be immediately successful. On the basis of this information the network can address to the terminal a new cell change order in which the target cell is one of the neighbour cells indicated by the terminal.

Below it is shown by way of example how the permission/information enabling operation according to the invention can be conveyed to a terminal in a RR_CELL_CHANGE_ORDER or PACKET_CELL_CHANGE_ORDER message. The information may also be conveyed in other messages used in the communication between the terminal and the network, such as e.g. system information (SI) and packet system information (PSI) messages. The following shows by way of example how the additional information required by the invention can be conveyed in the GPRS service to a terminal in a PACKET_CELL_CHANGE_ORDER, as expressed by its information elements:

```
<Packet Cell Change Order message content> ::=
        <PAGE_MODE : bit(2)>
        {
        {0<Global TFI :Global TFl IE>>
        |10<TLLI:bit (32)>}
        {0-Message escape
            {IMMEDIATE_REL:bit>
            <ARFCN: bit (10)
            <BSIC: bit (6)
            <NC Measurement Parameters:<NC measurement Parameters struct>>
            <Packet_cell_change_order_options: bit (3)>
            <padding bits>
        |<Non-distribution part error: bit(*) = <no string>>}
        |<message escape: 1 bit(*) = <no string>>}
        |Address information part error: bit(*) = <no string>>}
        |<Distribution part error: bit(*) = <no string>>;
```

The message tells, using three bits in the information element "Packet_cell_change_order_options" according to the invention, how the terminal is allowed to operate when it receives a cell change order. The other information elements comply with the standard. The bit combinations in the additional information according to the invention may be interpreted advantageously according to Table 1, for instance.

TABLE 1

Information element "Packet_cell_change_order_options" according to the invention

| Bits | | | |
|---|---|---|---|
| 3 | 2 | 1 | |
| 0 | 0 | 0 | MS shall obey the cell change order |
| 0 | 0 | 1 | MS shall without cell change reply with PACKET_CELL_CHANGE_FAILURE |
| — | — | — | |
| 1 | 0 | 0 | MS shall without cell change reply with PACKET_CELL_CHANGE_FAILURE |
| 1 | 0 | 1 | Reserved |
| — | — | — | |
| 1 | 1 | 0 | Reserved |
| 1 | 1 | 1 | MS shall without cell change reply with PACKET_CELL_CHANGE_FAILURE |

Bit combination 0-0-0 in Table 1 corresponds to operation according to the prior art, whereby the terminal shall obey the cell change order it has received. If one of bit combinations from 0-0-1 to 1-0-0 is assigned to the terminal, the terminal shall not in uncertain cases perform a cell change but shall instead send a PACKET_CELL_CHANGE_FAILURE message to the network. The received bit combination determines the maximum number of neighbour cells the information of which shall be included by the terminal in said reply message. Combination 0-0-1 means that the information of one neighbour cell will be sent, combination 0-1-0 means that the information of two neighbour cells will be sent, combination 0-1-1 means that the information of three neighbour cells will be sent, and combination 1-0-0 means that the information of four neighbour cells will be sent. Combination 1-1-1 causes the transmission of a PACKET_CELL_CHANGE_FAILURE message that does not include neighbour cell measurement data. The other combinations may be used for other cell change related functions if necessary.

The Packet_cell_change_order_options information element may be shorter than the three bits mentioned above. In that case the number of different bit combinations naturally becomes smaller, and the number of possible neighbours cells included in the message may advantageously be none for a certain bit combination and e.g. three for a certain second bit combination.

Below it is shown by way of example how the information according to the invention can be conveyed from a terminal to the network in a PACKET_CELL_CHANGE_FAILURE or HANDOVER_FAILURE message, expressed as their information elements, in a successful cell change is small because the timing information of the new cell is unknown to the terminal.

```
<Packet Cell Change Failure message content> ::=
    <TLLI:bit (32)>}
    <ARFCN: bit (10)
    <BSIC: bit (6)
    <Neighbour_cell_reporting: <neighbour cell reporting struct>
    <spare padding>
```

The new information element "Neighbour_cell_reporting" according to the invention may have the same basic structure as that described in a table presented in the ETSI document Reference [2]. In the operation according to the invention the information element in question has then the structure illustrated in Table 2:

TABLE 2

"Neighbour_cell_reporting" information element according to the invention

| 8 | 7 | 6 | 5 | 4 | 3 | 2 | 1 | |
|---|---|---|---|---|---|---|---|---|
| CAUSE | | | | NO-OF-NCELLS | | BCCH-FREQ-NCELL 1 | | octet 1 |
| BCCH-FREQ-NCELL 1 | | | | BSIC-NCELL 1 | | | | octet 2 |
| BSIC-NCELL 1 | | | RXLEV-NCELL 1 | | | | BCHH FREQ NCELL 2 | octet 3 |
| BCCH-FREQ-NCELL 2 | | | | BSIC-NCELL 2 | | | | octet 4 |
| BSIC-NCELL 2 | | | | RXLEV-NCELL-2 | | | | octet 5 |
| BCCH-FREQ-NCELL 3 | | | | | BSIC-NCELL 3 | | | octet 6 |
| BSIC-NCELL 3 | | | BCCH-FREQ-NCELL-3 | | | | | octet 7 |
| RXLEV NCELL 3 | | | | | | | | octet 8 |

Table 2 shows a measurement report according to the invention which report advantageously comprises eight octets. The first four bits of the first octet advantageously indicate the cause of the cell change failure. Operation according to the invention can possibly use the already existing cause codes but it is possible to add to them a new code for the operation according to the invention. The next two bits in the first octet indicate the number of those neighbour cells NO-OF-NCELLS in the report the timing information of which is known to the terminal on the basis of the neighbour cell measurements performed by it. In this example case the data of three neighbour cells are advantageously transmitted. The last two bits in the first octet are used to convey the frequency information of a first neighbour cell BCCH-FREQ-NCELL 1, and the first three bits in the second octet are also used for this same purpose. The frequency information can be advantageously conveyed through either the absolute radio frequency carrier number ARFCN the different values of which refer to certain predetermined frequencies or as indexes to the list of neighbours given by the network to the terminal. The rest of the bits in the second octet are used to convey part of the neighbour cell identity information BSIC-NCELL 1, and the rest of that information is conveyed through the first bit of the third octet. Next six bits in the third octet are used to convey the level measurement data of the first neighbour cell RXLEV-NCELL 1. The data for the two other neighbour cells are transmitted in the following octets in the order described above. The last octet to be used is octet number eight, and its first bit is used to convey the last bit of the level measurement data of the third neighbour cell RXLEV 3.

In an advantageous embodiment no ARFCN information is transmitted as such in the measurement report but the ARFCN data in question are indexed in the cellular system in a manner known to both the terminal and the network. In this case it suffices to include the indices in question in the measurement report according to the invention transmitted to the base station.

In another advantageous embodiment the terminal arranges the neighbour cell data in the measurement report advantageously in the order according to the received RX level (RXLEV) measured by it. In that case the level measurement data may either be included in the measurement report according to the invention or they may be left out of it. By leaving the level measurement data out it is possible to reduce the amount of data transmitted in the cellular system, while still being able to convey to the network the information about the order which from the cell change standpoint is best for the terminal.

Figure 5:
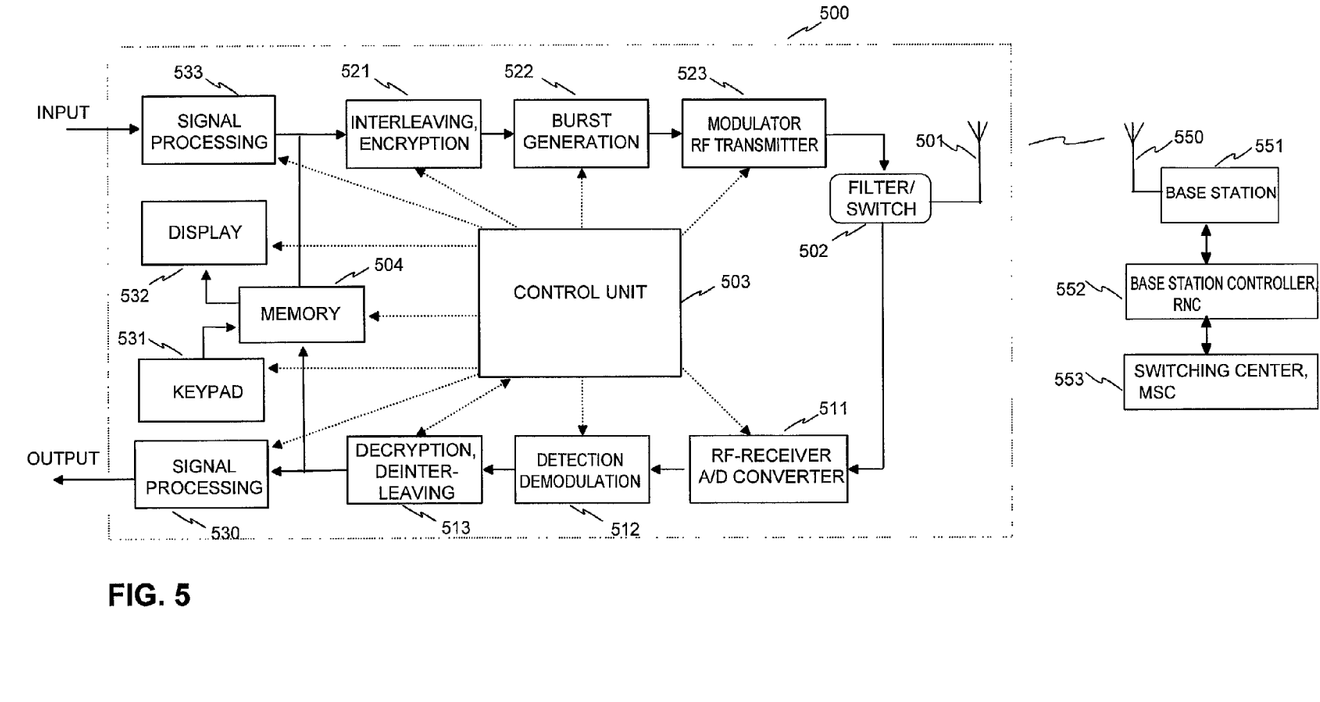
FIG. 5 shows by way of example the essential structure of a terminal according to the invention.

FIG. 5. shows in the form of simplified block diagram a terminal 500, advantageously a mobile station, according to the invention and its connection to a cellular telephone network. The mobile station comprises an antenna 501 for receiving radio-frequency (RF) signals transmitted by base stations. A received RF signal is directed by a switch 502 to a RF receiver 511 where the signal is amplified and converted digital. The signal is then detected and demodulated in block 512. Block 513 performs decryption and deinterleaving. Then follows signal processing in block 530. Received data may be stored as such in the mobile station's memory 504 or, alternatively, the processed packet data are taken after the signal processing to a potential external device such as a computer. A control unit controls the above mentioned reception blocks in accordance with a program stored in the unit. Transmission from the mobile station is performed e.g. as follows. Controlled by the control unit 503, block 533 performs possible signal processing on the data block 521 performs interleaving and encryption on the processed signal to be transmitted. Bursts are generated from the encoded data, block 522, which are modulated and amplified into a RF signal to be transmitted, block 523. The RF signal to be transmitted is led to the antenna 501 through the switch 502. Also these processing and transmission functions are controlled by the control unit 503. Also illustrated in FIG. 5 are a keypad 531 for inputting information or commands which may be stored in memory 504. A display 532 can be used to display data stored in the memory 504.

In the terminal of FIG. 5, the parts that are essential from the invention's perspective include the prior-art reception blocks 511–513, by means of which the terminal receives, demodulates and decodes the messages transmitted by base stations and measures the received signal power levels, as well as the control unit 503 which processes the information contained in the messages and controls the operation of the terminal. Additional features required by the operation according to the invention have to be added to the operation of the control unit in order to implement the message indicating cell change failure. Part of the memory 504 of the terminal must be allocated to information relating to neighbour cell selection, such as e.g. information about neighbour cells' BCCH frequencies received from base stations, information about the received signal level, information about the neighbour cells' timing information, and information about the quality of service provided by the neighbour cells. For this purpose it is naturally possible to use a detachable memory device in connection with the terminal, say a SIM card which is known as such. By means of the transmission blocks 521–523 the terminal sends the cell change messages, both those according to the standards and those according to the invention, to base stations.

The hardware requirements caused by the invention on prior art base stations are minimal. Base station 551 and/or base station controller 552, and switching center 553 have access to a data-base (not shown in FIG. 5) containing neighbour cell information about the BCCH frequencies and service levels, such as the ability of neighbour cells to provide GPRS service, for example. To this database it is possible to add information according to the invention sent by the terminal about the cells for which the terminal indicates that a cell change to them is impossible at that moment, and also information about the cells to which a cell change could be successfully performed at that moment. On the basis of the information received the base station can then assign another cell to the terminal. The base station 551 is coupled to the terminal 500 via antenna 550.

Naturally the embodiments described above are exemplary only and do not limit the application of the invention. Particularly it should be noted that although the examples described above relate to the GSM and GPRS systems, the invention is applicable cable to any other digital cellular system as well. Especially we could mention the DCS1800 (Digital Communications System at 1800 MHz), IS-54 (Interim Standard 54) and PDC (Personal Digital Cellular) and in particular the forthcoming third-generation digital cellular UMTS (Universal Mobile Telecommunications System). In addition, the inventional idea can be applied in many ways within the limits defined by the claims.

REFERENCES

[1] ETSI 05.08 version 6.4.0
[2] ETSI 04.08 version 6.2.0 section 10.5.2.20 FIG. 10.5.47

The invention claimed is:

1. A method for controlling a cell change in a service network, comprising
    a terminal performs neighbour cell measurements for a cell change,
    the network makes a cell change decision based on said measurement results, network load and the terminal's service need, and
    the network sends to the terminal a cell change order instructing the terminal to switch over to a new cell,
    characterized in that if the new serving cell assigned to the terminal in the cell change order is a cell, the timing information of which is unknown to the terminal, after neighbour cell measurements, the cell change will not take place, but the terminal will send to the base station a cell change failure message instead of attempting a cell change.

2. The method according to claim 1, characterized in that the service network is a GPRS network.

3. The method according to claim 2, characterized in that to the cell change order PACKET_CELL_CHANGE_ORDKR (43) an information element has been added which gives the terminal a right not to perform the cell change if the terminal does not know the timing information of the new cell assigned to it.

4. The method according to claim 2, characterized in that the message (47) sent by the terminal to the base station, indicating the non-execution of the cell change, is a "Packet_cell_change_failure" message.

5. The method according to claim 1 where the cell change failure message includes a cause of the cell change failure.

6. The method according to claim 1 where the cell change failure message includes neighbour cell information.

7. The method of claim 1 further comprising that the cell change failure message sent by the terminal includes information on one or more neighbouring cells for which the terminal already has timing information.

8. A method for controlling a cell change in a service network, comprising
    a terminal performs neighbour cell measurements for a cell change, the network makes a cell change decision based on said measurement results, network load and the terminal's service need, and the network sends to the terminal a cell change order instructing the terminal to switch over to a new cell, the cell change order includes an information element which gives the terminal a right not to perform the cell change if the terminal does not know the timing information of the new cell assigned to it, wherein, if the new serving cell assigned to the terminal in the cell change order is a cell, the timing information of which is unknown to the terminal, after neighbour cell measurements, the cell change will not take place, but the terminal will send to the base station a cell change failure message instead of attempting a cell change, and wherein, the service network is a GPRS network and the information enabling the cancellation of the execution of the cell change order is transmitted in a signalling message to the terminal at least partly in the form of the following information elements:

```
<Packet Cell Change Order message content> ::=
        <PAGE_MODE : bit(2)>
        {
        {0<Global TFI :Global TFI IE>>
        |10<TLLI:bit (32)>}
        {0-Message escape
            {IMMEDIATE_REL:bit>
            <ARFCN: bit (10)
            <BSIC: bit (6)
        <NC Measurement Parameters:<NC measurement Parameters struct>>
            Packet_cell_change_order_options: bit (3)>
            <padding bits>
        |<Non-distribution part error: bit(*) = <no string>>}
        |<message escape: 1 bit(*) = <no string>>}
        |Address information part error: bit(*) = <no string>>}
        |<Distribution part error: bit(*) = <no string>>.
```

9. The method according to claim 8, characterized in that the bit combination "0-0-0" of the "Packet_cell_change_order_options" information element in said signalling message means that the terminal shall carry out the cell change order, and bit combinations "0-0-1", "0-1-0", "0-1-1", "1-0-0" and "1-1-1" allow the terminal not to carry out the cell change order if the terminal does not know the timing information of the new cell.

10. A method for controlling a cell change in a service network, comprising
  a terminal performs neighbour cell measurements for a cell change,
  the network makes a cell change decision based on said measurement results received in a measurement report, network load and the terminal's service need, and
  the network sends to the terminal a cell change order instructing the terminal to switch over to a new cell,
  wherein, if the new serving cell assigned to the terminal in the cell change order is a cell, the timing information of which is unknown to the terminal, after neighbour cell measurements, the cell change will not take place, but the terminal will send to the base station a cell change failure message instead of attempting a cell change, the message being a "Packet cell change failure" message, and
  wherein, the service network is a GPRS network and the information sent by the terminal to the base station is transmitted to the base station in the network in a signalling message at least partly in the form of the following information elements:

```
<Packet Cell Change Failure message content> ::=
        <TLLI:bit (32)>}
        <ARFCN: bit (10)
        <BSIC: bit (6)
        <Neighbour_cell_reporting: <neighbour cell reporting struct>
        <spare padding>.
```

11. The method according to claim 10, characterized in that the "Neighbour_cell_reporting" information element in said signalling message comprises information about the number of neighbour cells the timing data of which are included in the measurement report as well as the neighbour cell measurement data of the measured neighbour cell.

12. The method according to claim 11, characterized in that the measurement report comprises information only about those neighbour cells the timing information of which has been learned from the neighbour cell measurements performed by the terminal.

13. The method according to claim 12, characterized in that in the measurement report sent by the terminal the neighbour cell measurement data include at least the ARFCN (absolute radio frequency channel number) information representing the centre frequencies of the neighbour cells' BCCH channels.

14. The method according to claim 13, characterized in that the ARFCN information is replaced by an indexing system known in the cellular system.

15. The method according to claim 13, characterized in that the neighbour cell measurement data further include the neighbour cell identity information (BSIC).

16. The method according to claim 15, characterized in that the terminal arranges the neighbour cell measurement data in the measurement report in the order according to the reception level (RXLEV) measured by it for each neighbour cell.

17. The method according to claim 16, characterized in that the neighbour cell measurement data included in the measurement report further comprise the reception levels (RXLEV) of the measured neighbour cells.

18. A terminal in a cellular radio system, equipped with means for connecting to a certain service and comprising means for receiving signalling messages from base stations and means for performing cell specific measurements in order to find a suitable serving cell, characterized in that the terminal is further equipped with means for determining the timing information of neighbour cells and means for sending a cell change failure message to the base station of the current cell instead of trying a cell change, in the case that the timing information of the base station of the new cell assigned to the terminal in a cell change order by the serving base station is unknown to the terminal.

19. The terminal according to claim 18, characterized in that said certain service is the GPRS data packet transmission service.

20. The terminal according to claim 18, characterized in that said signalling messages are signalling messages of the GPRS data packet transmission service.

21. The terminal according to claim 18, characterized that it is further equipped with means for sending neighbour information together with the cell change failure message.

22. A cellular radio system comprising base stations and associated
cells and terminals, in which system
the base stations are equipped with means for conveying signalling messages between a base station and a terminal, and
the terminals are adapted so as to operate at a certain service level and to convey signalling messages between a terminal and a base station, characterized in that it further comprises information, which is known to a terminal, about a set of neighbour cells of said terminal, the timing information of the base stations of which neighbour cells the terminal has determined, whereby said system is adapted so as to convey, after a cell change order addressed to the terminal, a cell change failure massage from the terminal to the base station if the timing information of a base station of a new cell assigned to the terminal in the cell change order by the serving base station is unknown to the terminal instead of trying a cell change.

23. The cellular radio system according to claim 22, characterized in that said certain service is the GPRS data packet transmission service.

24. The cellular radio system according to claim 22, characterized in that said signalling messages are signalling messages of the GPRS data packet transmission service.

25. The cellular radio system according to claim 22, characterized in that said cell change failure message includes for the purpose of selecting a new serving cell a set of neighbour cells determined by the terminal.

26. A terminal in a cellular radio system, equipped with transmitter for a connecting to a certain service and comprising a receiver for receiving signaling messages from base stations and a reception block for performing cell specific measurements in order to find a suitable serving cell, characterized in that it is further equipped with a control unit for determining the timing information of neighbour cells and a transmission block for sending a cell change failure message to the base station of the current cell instead of trying a cell change, in the case that the timing information of the base station of the new cell assigned to the terminal in a cell change order by the serving base station is unknown to the terminal.

27. A method for controlling a cell change comprising:
a terminal receiving a cell change order from the network;
the terminal determining whether timing information related to a new cell identified in the cell change order is available in the terminal; and
if the timing information for the new cell is available, the terminal makes a cell change attempt; and
if the timing information for the new cell is not available, the terminal sends a packet cell change failure message to the network that includes information on neighbouring cells for which the terminal already has timing information, wherein the network send another new cell change order based on the information included in the packet cell change failure message.

28. The method of claim 27 further comprising the terminal:
receiving the another new cell change order;
determining if timing information is available in the terminal for a cell identified in the another new cell change order;
if information is available, attempting a cell change; and
testing the cell change attempt.

* * * * *